Figure 1:
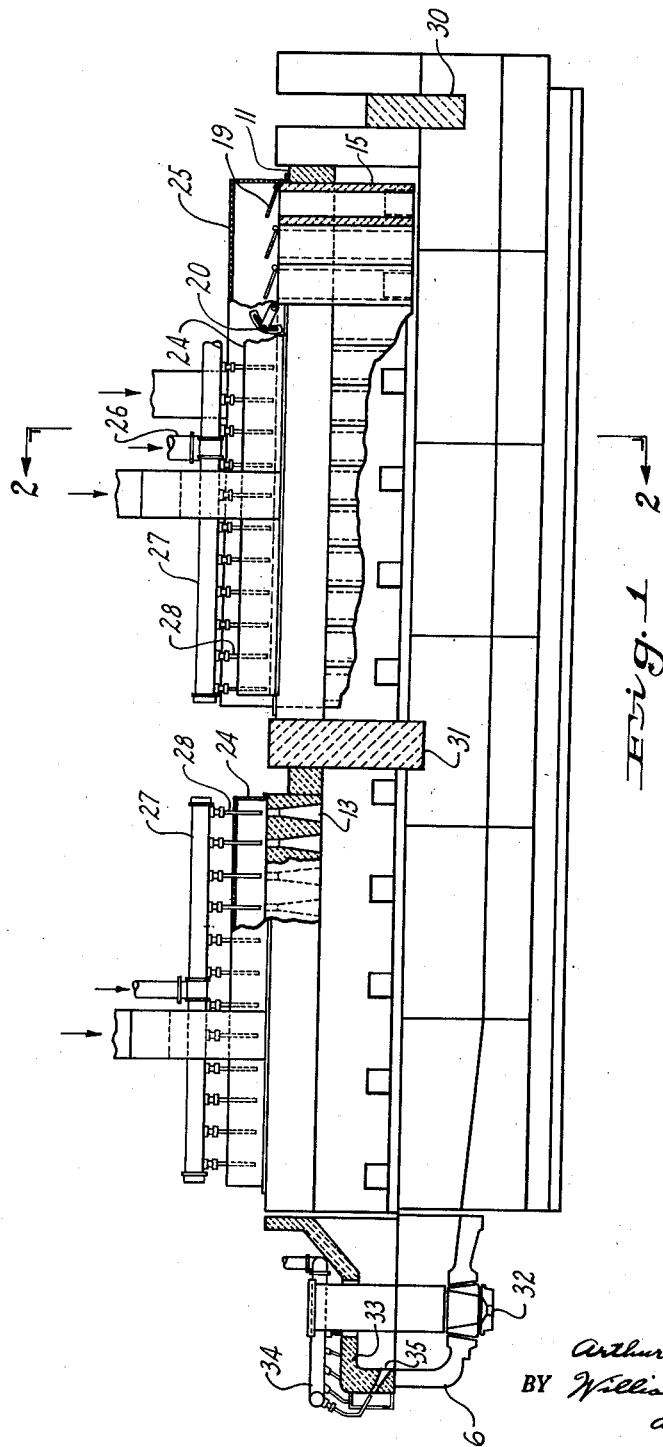

Oct. 23, 1956

A. W. SCHMID 2,767,518

FOREHEARTH STRUCTURE

Filed Jan. 13, 1953

2 Sheets-Sheet 2

INVENTOR.
Arthur W. Schmid
BY William B Jaspert
Attorney.

United States Patent Office 2,767,518
Patented Oct. 23, 1956

2,767,518

FOREHEARTH STRUCTURE

Arthur W. Schmid, Pittsburgh, Pa.

Application January 13, 1953, Serial No. 331,055

1 Claim. (Cl. 49—54)

This invention relates to new and useful improvements in forehearth structures for use in conditioning molten glass for suspended charge, or the like, feeding, the forehearth being interposed between the glass melting tank and the feeder spout or bowl.

Some of the difficulties encountered in the feeding of glass is the maintenance of suitable temperatures and the prevention of stagnation which results when some of the glass accumulates along the walls of the forehearth due to improper circulation and temperature controls.

It is among the objects of the present invention to provide for the proper heating of the glass throughout the forehearth while maintaining proper temperatures for feeding through the application of a cooling medium.

Figure 2:
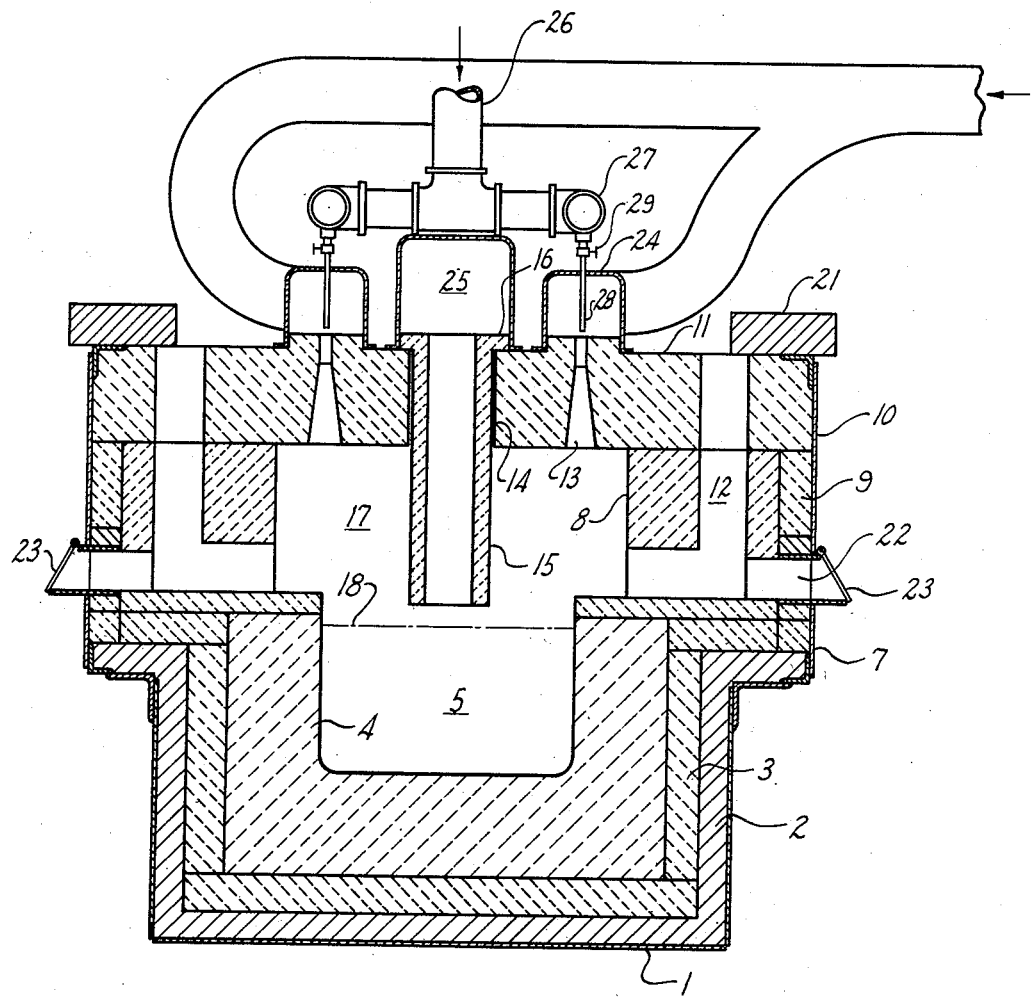

The invention will become more apparent from a consideration of the accompanying drawings constituting a part hereof in which like reference characters designate like parts and in which:

Fig. 1 is a side elevational view partially in cross section of a forehearth structure embodying the principles of this invention, and Fig. 2 is a vertical section taken along the line 2—2 of Fig. 1.

With reference to the several figures of the drawing the numeral 1 designates a steel casing lined with insulating material 2 and 3 surrounding the forehearth refractory tile 4 which forms a trough 5 for retaining the glass as it is delivered from the glass melting tank that would be located on the right hand end of the forehearth as viewed in Fig. 1 to the feeder spout or boot designated by the numeral 6 at the left hand end of the forehearth as viewed in Fig. 1. The forehearth is flanged as shown in 7, Fig. 2 to provide space for a side wall consisting of refractory tile 8 and insulating material 9 with a steel casing 10. The roof is constructed of refractory tile 11 that extends over to form a part of the side wall. The tiles 8 and 11 are provided with flue passages generally designated by the numeral 12 to form an L-shaped flue and the roof tile 11 is further provided with a conical shaped burner opening 13. Disposed through openings 14 in the roof tile 11 are a plurality of refractory tubes 15 supported on the roof tile by a flange 16, the tube 15 extending downwardly through the treating chamber designated by the numeral 17 above the forehearth trough 5 in which the level of the glass is indicated by a line 18. As shown in Fig. 1, a series of tubes 15 are disposed longitudinally of the forehearth and they are provided with dampers 19 with an accessible lever 20 for regulating the opening. Also the flues 12 may be regulated by blocks 21, Fig. 2, and peep holes 22 with covers 23 are provided as shown in Fig. 2.

Combustion air is supplied above the burner ports 13 by ducts 24 which constitute a manifold for all of the burners, and cooling air is supplied through a duct 25 common to all of the cooling tubes 15. The fuel is supplied by a main 26 having manifolds 27 with burner nozzles 28 extending downwardly to the burner ports 13 in the manner shown in Fig. 2, each burner nozzle being provided with a valve 29 so that they may be individually regulated.

With reference to Fig. 1 of the drawing, a skimmer block 30 is provided to extend into the forehearth channel 5 to prevent the surface glass passing from the tank into the forehearth. A partition 31 divides the forehearth into a heating zone on the right hand side of the partition 31 as viewed in Fig. 1, and a tempering or conditioning zone to the left of the partition block. The feeder boot is provided with a feeding orifice 32 through which the glass is fed in suspended gobs that are sheared off and delivered to the forming molds. The boot is provided with a refractory top 33 surrounded by a burner manifold 34, the top being provided with burner ports 35 as shown. The conditioning zone is provided with the air manifold 24, the fuel manifold 27, the burner ports 13 and the burners 28, the same as the heating zone on the right hand side of the partition block 31. The cooling system consisting of the tubes 15 and the air manifold 25 is eliminated in the tempering or conditioning zone.

The operation of the above described forehearth structure is briefly as follows. The glass is fed from the tank and passes under the skimmer block 30 into the trough 5 where it is subjected to the heat of the series of burners which are of a special design that does not constitute a part of the present invention. The burners function to extend the burner flame downwardly to the upper edge of the trough 5 to maintain the glass in channel 5 at a temperature that provides for constant circulation or movement of the glass along the edges of the channel to prevent devitrification. In doing this, however, the glass in the center of the channel may be heated excessively and for this reason a blast of cold air is supplied through the refractory tubes 15 to the center of the glass channel above the surface of the glass.

The cooling air from tubes 15 and the products of combustion from the burner 13 pass out of the treating chamber 17 through the flues 12, and by regulating the heat of the burners and the supply of cooling air together with the degree of opening of the flues 12 controlled by the damper blocks 21, a suitable heating condition can be maintained throughout the length of the forehearth. As the glass is being fed from the orifice 32, it exerts a constant pull through the forehearth channel 5 and when the glass is delivered to the conditioning zone on the left side of the partition block 31, its temperature conditions are properly maintained by the series of burners in that zone. The burner manifold 34 above the feeder boot further prevents cooling of the glass which is maintained preferably in a swirling motion to assure that the glass is of a uniform temperature and quality when it reaches the feeding orifice 32.

It is evident from the foregoing description of this invention that forehearth structures embodying the firing and cooling principles herein described and shown, provide for positive regulation of temperature and conditioning of the glass.

Although one embodiment of the invention has been herein illustrated and described, it will be evident to those skilled in the art that various modifications may be made in the details of construction without departing from the principles herein set forth.

I claim:

In a forehearth for conditioning glass, a glass flow channel extending longitudinally thereof having an enlarged treating chamber above the channel forming a shoulder at the top of the channel, flues extending from the shoulder through the wall of the forehearth, burner ports in the roof of the forehearth structure for directing the flame vertically downward to the shoulder portion of the flow channel, and means for supplying a cooling medium centrally above the glass flow channel at the bottom of the treating chamber, said means comprising refractory tubes connected to a source of cooling air terminating substantially adjacent the glass level of the channel.

References Cited in the file of this patent

UNITED STATES PATENTS

| | | |
|---|---|---|
| 1,893,061 | Peiler | Jan. 3, 1933 |
| 1,970,094 | Honiss | Aug. 14, 1934 |
| 1,970,113 | Wardley | Aug. 14, 1934 |
| 2,139,770 | Peiler | Dec. 13, 1938 |
| 2,144,973 | Honiss | Jan. 24, 1939 |
| 2,226,498 | Koob | Dec. 24, 1940 |
| 2,299,084 | Ferngren | Oct. 20, 1942 |
| 2,616,380 | Griffin | Nov. 2, 1952 |
| 2,618,906 | Hess | Nov. 25, 1952 |